United States Patent [19]

Poole

[11] Patent Number: 5,849,649
[45] Date of Patent: Dec. 15, 1998

[54] GLASS COMPOSITION

[75] Inventor: Sucharitra D. Poole, Hopton, United Kingdom

[73] Assignee: Johnson Matthey Public Limited Company, London, United Kingdom

[21] Appl. No.: 843,293

[22] Filed: Apr. 14, 1997

Related U.S. Application Data

[63] Continuation of Ser. No. 594,477, Jan. 31, 1996, abandoned, which is a continuation of Ser. No. 709,191, Jun. 3, 1991, abandoned.

[30] Foreign Application Priority Data

Jun. 5, 1990 [GB] United Kingdom .................. 9012533

[51] Int. Cl.$^6$ ...................................................... C03C 8/04
[52] U.S. Cl. ........................... 501/26; 501/24; 501/25; 501/21; 501/18; 501/67; 428/426; 428/432
[58] Field of Search .................. 501/21, 27, 30, 501/64, 18, 26, 66, 67, 72, 25, 24; 428/426, 432

[56] References Cited

U.S. PATENT DOCUMENTS

| | | | |
|---|---|---|---|
| 2,278,867 | 4/1942 | Deyrup | 428/427 |
| 3,871,890 | 3/1975 | Eppler et al. | 106/48 |
| 4,340,645 | 7/1982 | O'Conor | 428/428 |
| 4,446,241 | 5/1984 | Francel et al. | |
| 4,521,524 | 6/1985 | Yamashita | 501/64 |
| 4,590,171 | 5/1986 | Nigran | 501/21 X |
| 4,814,298 | 3/1989 | Nelson et al. | 501/21 X |
| 5,061,658 | 10/1991 | Dorer et al. | |

FOREIGN PATENT DOCUMENTS

| | | |
|---|---|---|
| 0204432 | 12/1986 | European Pat. Off. . |
| 0313904 | 5/1989 | European Pat. Off. . |
| 0321297 | 6/1989 | European Pat. Off. . |
| 0358933 | 3/1990 | European Pat. Off. . |
| 0404501 | 12/1990 | European Pat. Off. . |
| 2546159 | 11/1984 | France . |
| 57-088039 | 6/1982 | Japan . |
| 141766 | 3/1986 | Poland . |
| 141766 | 6/1988 | Poland . |
| 1452484 | 10/1976 | United Kingdom . |
| 2106891 | 4/1983 | United Kingdom . |
| 2115403 | 9/1983 | United Kingdom . |

OTHER PUBLICATIONS

Translation of pp. 316–320 of Silikat Lexikon; by Wilhelm Hinz, 1995.

Translation of p. 624 of Fundamentals of general and inorganic chemistry; by Dr. sc. nat. Hans Rudolf Christen, 5th Edition, 1986.

Translation of Chemical approach to glass, pp. 309–311 and 397–398 (1984).

*Primary Examiner*—Karl Group
*Attorney, Agent, or Firm*—Stevens, Davis, Miller & Mosher, L.L.P.

[57] ABSTRACT

A glass flux composition consisting essentially in mol percent of 3.0–13.0 lithium oxide, 0.5–3.5 potassium oxide, 2.5–7.0 sodium oxide, 0.5–2.5 zinc oxide, 2.0–8.0 aluminium oxide, 15–30 boron oxide, 44–68 silica, 1.0–7.0 zirconium oxide, 0–4.0 calcium oxide, 0–3.0 lanthanum oxide, 0–1.0 other rare earth metal oxide, 0–1.0 yttrium oxide, 0–4.0 magnesium oxide, 0–4.0 strontium oxide, 0–4.0 titanium oxide, 0–10 phosphorus pentoxide, 0–1.5 lead oxide and 0–13.0 fluoride is useful for preparing an enamel or cover flux composition, especially for application to ceramic ware.

13 Claims, No Drawings

GLASS COMPOSITION

This application is a Continuation of application Ser. No. 08/594,477, filed Jan. 31, 1996 now abandoned, which is a Continuation of application Ser. No. 07/709,191, filed Jun. 3, 1991 now abandoned.

This invention relates to glass flux compositions for use in enamels and cover flux coatings.

Many different ingredients in many different concentrations in many different combinations are known in glass flux compositions in order to provide the properties desired. Such fluxes are admixed with pigments to make enamel compositions to decorate articles. Alternatively, such fluxes are dispersed in carrier materials to make cover flux compositions for application to articles to give them a protective coating. A surprisingly useful new flux composition has now been discovered.

Lead is widely used as a major constituent of enamels. There is concern, however, at the possibility of lead being leached out of enamels on articles, for instance from containers in contact with food. Accordingly, the invention provides a replacement which is not based on the use of lead in the formulations.

U.S. Pat. No. 4,340,645 discloses a ceramic frit which when smelted consists essentially of:

(a) from 4.0 to 6.5 wt % of a compound selected from the group consisting of potassium oxide, sodium oxide, lithium oxide, and mixtures thereof;
(b) from 7.0 to 12.5 wt % of zinc oxide;
(c) from 7.0 to 12.0 wt % of calcium oxide;
(d) from 0 to 0.7 wt % of magnesium oxide;
(e) from 0 to 5.0 wt % of barium oxide;
(f) from 2.0 to 4.0 wt % of strontium oxide;
(g) from 2.5 to 6.0 wt % of boric oxide;
(h) from 7.0 to 8.5 wt % of aluminium oxide;
(i) from 54.0 to 60.0 wt % of silica;
and (j) from 0 to 1.0 wt % of zirconium oxide; all said wt % being based on the total weight of all of said components (a) through (j).

GB specification 2115403A discloses an optical and opthalmic glass with a refractive index greater than or equal to 1.56, an Abbe number greater than or equal to 40 and a density of less than or equal to 2.70 g/cm$^3$, having the following composition in wt %:

|            |                                    |    |    |    |
|------------|------------------------------------|----|----|----|
|            | SiO$_2$                            | 47 | to | 75 |
|            | B$_2$O$_3$                         | 1  | to | 20 |
|            | Al$_2$O$_3$                        | 0  | to | 10 |
|            | P$_2$O$_5$                         | 0  | to | 5  |
| the sum of |                                    |    |    |    |
|            | SiO$_2$, B$_2$O$_3$, AlO$_3$ and P$_2$O$_5$ | 57 | to | 85 |
|            | Li$_2$O                            | 0  | to | 15 |
|            | Na$_2$O                            | 0  | to | 10 |
|            | K$_2$O                             | 0  | to | 10 |
| the sum of |                                    |    |    |    |
|            | M$_2$O (M = Li,Na,K)               | 5  | to | 17 |
|            | CaO                                | 0  | to | 20 |
|            | MgO                                | 0  | to | 15 |
|            | SrO                                | 0  | to | 4  |
|            | BaO                                | 0  | to | 4  |
|            | ZnO                                | 0  | to | 5  |
|            | TiO$_2$                            | 1  | to | 15 |
|            | ZrO$_2$                            | 0  | to | 8  |
|            | Nb$_2$O$_5$                        | 0  | to | 5  |
| and        | F$^-$                              | 0  | to | 5. |

U.S. Pat. No. 4,590,171 claims a frit essentially free from cadmium and lead, demonstrating good glass stability, a coefficient of thermal expansion (20°–300° C.) between about 58–62×10$^{-7}$/°C., a softening point between about 600°–625° C., and excellent resistance to attack by acids found in foods and to attack by alkaline detergents, said frit consisting essentially, expressed in wt % on the oxide basis, of:

|     |             |      |    |       |
|-----|-------------|------|----|-------|
|     | Li$_2$O     | 3    | to | 4     |
|     | Na$_2$O     | 0.75 | to | 3     |
|     | BaO         | 3.5  | to | 9.5   |
|     | B$_2$O$_3$  | 14   | to | 17.5  |
|     | Al$_2$O$_3$ | 6.75 | to | 8.75  |
|     | SiO$_2$     | 48   | to | 55    |
|     | ZrO$_2$     | 6.75 | to | 10.5  |
| and | F           | 3    | to | 4.    |

U.S. Pat. No. 3,871,890 discloses a component for glazing low-expansion ceramic whiteware with a substantially non-porous, acid-resistant, opaque glaze, a substantially water-insoluble ceramic frit being substantially entirely in the vitreous state as frit particles, said frit after melting into a fluent vitreous state being thermally autocrystallisable to a low-expansion, semi-crystalline glass-ceramic glaze containing zirconia or zircon as one of the crystalline phases and having a coefficient of thermal expansion of less than 5×10$^{-6}$/°C., said frit consisting essentially of:

| Ingredient  | Wt %                                                                                                          |
|-------------|---------------------------------------------------------------------------------------------------------------|
| Li$_2$O     | about 3 to 22%                                                                                                |
| MgO         | about 0 to 6%, 0.74 part of MgO replacing 1 part of Li$_2$O when MgO is used, but a minimum of 4% Li$_2$O + MgO being present |
| Al$_2$O$_3$ | about 17 to 38%                                                                                               |
| SiO$_2$     | about 26 to 70%, the subtotal sum of Li$_2$O, MgO, Al$_2$O$_3$ and SiO$_2$ being 70 to 90%                    |
| ZrO$_2$     | about 6 to 25%                                                                                                |
| Flux        | about 4 to 19%.                                                                                               | wherein said flux is selected from the group consisting of: B$_2$O$_3$, K$_2$O, F, PbO, Na$_2$O, CaO, SrO, ZnO, BaO up to 5% or mixtures of same.

The present invention provides a glass flux composition consisting essentially in mol percent of 3.0–13.0 lithium oxide, 0.5–3.5 potassium oxide, 2.5–7.0 sodium oxide, 0.5–2.5 zinc oxide, 2.0–8.0 aluminium oxide, 15–30 boron oxide, 44–68 silica, 1.0–7.0 zirconium oxide, 0–4.0 calcium oxide, 0–3.0 lanthanum oxide, 0–1.0 other rare earth metal oxide, 0–1.0 yttrium oxide, 0–4.0 magnesium oxide, 0–4.0 strontium oxide, 0–4.0 titanium oxide, 0–10 phosphorus pentoxide, 0–1.5 lead oxide and 0–13.0 fluoride. The composition preferably comprises a frit.

The invention provides also an enamel composition consisting essentially by weight of 10–90% of the glass flux composition comprising a frit together with 10–90% pigment.

The invention provides also a cover flux composition comprising the glass flux composition comprising a frit, dispersed in a carrier material.

The invention also provides an article bearing on its surface the enamel composition which has been fired thereon.

The invention also provides an article bearing on its surface the cover flux composition which has been fired thereon.

The invention provides also a method of applying an enamel composition to an article, which method comprises applying the present enamel composition to the article and then firing the composition.

The invention provides also a method of applying a cover flux composition to an article, which method comprises applying the present cover flux composition to the article and then firing the composition.

The present glass flux composition is advantageously lead-free. By "lead-free" we mean that no lead has been included deliberately but a slight amount ;may have been picked up incidentally, for instance during processing in equipment previously used for lead-containing compositions. Preferably, the glass flux composition is lead-less, by which we mean that no lead has been included deliberately and no lead has been picked up incidentally. The present glass flux composition is also cadmium-free. It can readily be made into an enamel or cover flux composition which can readily be applied and fired. After firing, the enamel or cover flux composition has good chemical and mechanical resistance, for instance resistance to acids or alkalis, and has a good gloss making it particularly attractive.

The content of the present glass flux compostion is expressed herein in mol percents. The weight percent contents depend on which if any other rare earth metal oxide is present. For these purposes, we count yttrium as not being a rare earth metal.

In a particular embodiment, the present glass flux composition consists essentially in mol percent of 3.0–11.5 lithium oxide, 0.5–3.5 potassium oxide, 2.5–5.0 sodium oxide, 0.5–4.0 calcium oxide, 0.5–2.5 zinc oxide, 2.0–7.5 aluminium oxide, 15–30 boron oxide, 44–68 silica, 1.0–5.0 zirconium oxide, 0–3.0 lanthanum oxide, 0–1.0 other rare earth metal oxide, 0–1.0 yttrium oxide, 0–4.0 magnesium oxide, 0–4.0 strontium oxide, 0–4.0 titanium oxide, 0–10 phosphorus pentoxide, 0–1.5 lead oxide and 0–8.0 fluoride.

The present glass flux composition preferably contains 7–10.2 mol percent lithium oxide. Its potassium oxide content is preferably 1.5–1.8 mol percent. Its sodium oxide content is preferably 3.4–4.0 mol percent. Its calcium oxide content is preferably 0.8–1.2 mol percent. Its zinc oxide content is preferably 1.0–1.3 mol percent. Its aluminium oxide content is preferably 4.3–5.5 mol percent. Its boron oxide content is preferably 18.8–22.5 mol percent. Its silica content is preferably 48–57 mol percent. Its zirconium oxide content is preferably 1.8–3.4 mol percent. For increased brightness of fired coatings based on it, the composition very desirably contains 0.1–3.0, especially 0.2–0.6, mol percent lanthanum oxide. Its content of other rare earth metal oxide is preferably 0–0.4 mol percent. Its content of yttrium oxide is preferably 0–0.6 mol percent. Its content of magnesium oxide is preferably 0–1.5 mol percent. Its content of strontium oxide is preferably 0–1.5 mol percent. Its content of titanium oxide is preferably 0–3 mol percent. Its content of phosphorus pentoxide is preferably 0–6 mol percent. The composition preferably contains 0–7 mol percent fluoride; to avoid any possible pollution problem, however, fluoride is preferably avoided.

It can be seen that at most the composition contains much less lead than the usual lead-containing compositions. Preferably, the composition contains less than 0.2 mol percent lead oxide. It is especially preferred that it contains no added lead. It may pick up trace amounts of lead from the surroundings, for example from processing on equipment previously employed to process lead-containing compositions, but preferably steps are taken to avoid this.

Any rare earth metal oxide other than lanthanum oxide is preferably one or more, usually one, of praseodymium oxide, cerium oxide and neodymium oxide, especially neodymium oxide. Whatever the form of the cerium oxide (and in particular whether it is $CeO_2$ or $Ce_2O_3$), its content is calculated as $CeO_2$.

The flux composition can be made and used in conventional ways. The composition can be made by a process comprising admixing the ingredients. The ingredients can be introduced in the form of their oxides, or mixed oxides such as zirconium silicate or lithium aluminium silicate. Alternatively, ingredients can be introduced as compounds such as carbonates (for instance lithium carbonate) or nitrates (for instance potassium nitrate) which form the oxides during production. Any fluoride is preferably introduced as lithium fluoride, sodium fluoride or sodium fluosilicate. Any element, such as the lithium, sodium, or sodium and silicon, used to introduce the fluoride, counts also, calculated as oxide, towards any oxide content essential in the composition, as is conventional in the art. Any phosphorus pentoxide is preferably introduced as an ammonium or sodium phosphate, and again any element, such as the sodium, used to introduce the phosphorus pentoxide, counts also, calculated as oxide, towards any oxide content essential in the composition, as is conventional in the art. Advantageously, the flux composition comprises a frit, which can be prepared by a process comprising melting the ingredients together (for instance at 1200°–1350° C. for 1–3 hours), quenching to form a solid glass and optionally granulating. The flux composition preferably consists of the frit. Alternatively, a frit of some of the ingredients can be admixed in powder form with the remainder of the ingredients to form the flux composition. Alternatively again, part of the flux composition can be incorporated while admixing a frit consisting essentially of the other ingredients with a pigment to form an enamel composition.

The present flux composition, generally the frit, usually has a melting temperature in the range 470°–610° C., preferably 500°–580° C. Its thermal expansion is usually in the range $5.0–10.0 \times 10^{-6}/°C.$, preferably $6.0–8.0 \times 10^{-6}/°C.$ Its refractive index is usually 1.51–1.57.

The present enamel or cover flux composition can be made and used in conventional ways. It can te made by admixing the ingredients, preferably by milling. The pigment employed in the enamel composition can be conventional. The enamel composition consists essentially by weight of 10–90% of the glass flux composition comprising the frit together with 10–90% of pigment, preferably 60–90% of the glass flux composition together with 10–40% pigment. The enamel composition is usually applied as a dispersion in a carrier material. The dispersion usually contains 60–75% by weight of the enamel composition. The cover flux composition usually comprises 60–75% by weight of the glass flux composition comprising the frit, dispersed in a carrier material. In either case, the carrier material can be an aqueous or organic medium; it can be thermoplastic; it can be infra-red drying or ultra-violet curing; all such types of media are known and can be employed in their known ways. The enamel or cover flux composition is preferably lead-free, especially lead-less.

The enamel or glass flux composition can be applied to an article in the usual way. For instance, the enamel composition can be applied by printing (for example screen printing) or spraying, and the cover flux composition can be applied by printing (for example screen printing). Either composition can be applied as a paste. The enamel composition can be applied directly to the article to be decorated with the enamel. Alternatively, the enamel composition can be used to form a transfer which in turn is applied to the article to be decorated with the enamel. The cover flux composition can be used to form a layer in a transfer containing an enamel decoration layer, so that after application of the transfer to an article, the cover flux protects the underlying enamel decoration layer. In this way, the cover flux can inhibit the leaching of lead from an underlying lead-containing enamel layer. After application, the enamel or cover flux composition can be fired in the usual way, generally at 740°–1270° C. Usually for a standard firing cycle after application to glazed ceramic ware, the temperature is within the range 740–840° C. and the firing time is 5–7 hours, with the peak temperature being held for 0.8–1.3 hours. By "glazed" we mean that the article bears a fired glaze. Usually for a fast firing cycle after application to glazed ceramic ware, the firing temperature is within the range 740°–950° C. and the firing time is 0.5–4 hours, with the peak temperature being held for 5–20 minutes.

The enamel or cover flux composition is preferably applied to ceramic ware; bone china, earthenware and porcelain can all be treated. The ceramic ware bearing the fired composition preferably bears also a fired glaze. The enamel or flux composition is preferably applied to glazed ceramic ware. In all cases, the glaze is preferably lead-free, especially lead-less. Advantageously, the ceramic ware is an article adapted to contact food. Preferably, the ceramic article is table-ware such as a plate.

The invention is illustrated by the following Examples. In the Examples, the lithium oxide was provided in the form of lithium carbonate, the zirconia as zirconium silicate, the boron oxide as boric acid, the alumina as alumina hydrate, the calcium oxide as calcium carbonate, the sodium oxide as sodium carbonate, the potassium oxide as potassium nitrate, and the fluoride as lithium fluoride up to the content of lithium in the composition with any remainder as sodium fluoride. The remaining ingredients were provided as such. The frits were prepared by melting the ingredients together in a crucible at 1200°–1350° C. for 1 to 3 hours until a homogeneous mixture had been obtained, quenching the molten material in water, and drying. The frit was ground together with the pigment based on transition metal oxides at weight ratios of frit: pigment of 10:1 to 3.5:1 using a ball mill containing porcelain grinding medium for 16–20 hours to give the particle size distribution, measured on a Malvern laser particle sizer model 3600E type using as the dispersing agent 1 g/liter sodium hexametaphosphate solution:

50% less than 5.8 microns

90% less than 16.8 microns

10% less than 1.5 microns

The ground material was dried, and sieved through a 75 micron mesh (0.075 mm sieve aperture) to give the enamel composition. The enamel composition was dispersed in the commercial air-drying transfer-printing organic medium 63/537 available from Blythe Colours, Cresswell, England at weight ratios of powder to medium of 10:5–10:7 using a triple roll mill. The resultant paste was screen printed onto transfer sheets through a 90T screen (number count per cm). The sheets were covercoated using the commercial organic lacquer OPL 164 available from Blythe colours, Cresswell, England to obtain transfers. The transfers were applied, after soaking off the backing sheet, to china plates, porcelain plates and earthenware tiles, all previously glazed with lead-free glazes. The china was fired in a kiln whose temperature was raised at 150° C. per hour to a peak temperature of 780° C., the china being held at this temperature for 1 hour before being allowed to cool naturally to ambient temperature. The porcelain was standardly fired in a kiln whose temperature was raised at 150° C. per hour to a peak temperature of 810° C., the porcelain being held at this temperature for 45 minutes before being allowed to cool naturally to ambient temperature. The porcelain was fired in a fast firing cycle in a kiln whose temperature was raised at 32° C. per minute to a peak temperature of 950° C., the porcelain being held at this temperature for 5 minutes before being allowed to cool naturally to 600° C. and then cooled by forced air to ambient temperature. The earthenware was fired in a kiln whose temperature was raised at 150° C. per hour to a peak temperature of 740° C., the earthenware being held at this temperature for 1 hour before being allowed to cool naturally to ambient temperature. The gloss of fired enamels was assessed visually on a scale from A to E where A represents very glossy, C a good gloss and E matt. The colour strength of fired enamels was assessed visually on a scale from A to E where A represents very strong, C a good colour and E very weak. The acid resistance was assessed visually after immersing the article in 5% by volume acetic acid for 16 hours at ambient temperature, on a scale from A to E where A represents no evidence of attack and E very severe attack. The alkali resistance was assessed visually by immersing the article twice in a solution of 4 g/liter of material consisting of sodium metasilicate (40% by weight), sodium carbonate (40% by weight) and sodium tripolyphosphate (20% by weight) in de-ionised water at 73° C., on a scale from A to E where A represents no evidence of attack and E very severe attack.

EXAMPLES 1–7

The following frits were prepared:

|  | Example 1 | | Example 2 | | Example 3 | | Example 4 | |
|---|---|---|---|---|---|---|---|---|
|  | Wt % | Mol % | Wt % | Mol % | Wt % | Mol % | Wt % | Mol % |
| $K_2O$ | 2.32 | 1.60 | 2.33 | 1.56 | 2.33 | 1.57 | 2.32 | 1.60 |
| $Na_2O$ | 3.84 | 4.00 | 3.74 | 3.82 | 3.74 | 3.84 | 3.66 | 3.83 |
| CaO | 0.84 | 0.97 | 0.84 | 0.95 | 0.84 | 0.95 | 1.25 | 1.45 |
| ZnO | 1.46 | 1.16 | 1.46 | 1.14 | 1.46 | 1.14 | 1.45 | 1.16 |
| $Al_2O_3$ | 6.06 | 3.86 | 5.91 | 3.67 | 7.87 | 4.91 | 6.86 | 4.37 |
| $B_2O_3$ | 23.21 | 21.62 | 22.82 | 20.76 | 22.83 | 20.87 | 21.91 | 20.44 |
| $SiO_2$ | 55.52 | 59.92 | 54.28 | 57.21 | 52.96 | 56.10 | 51.80 | 55.98 |
| $ZrO_2$ | 4.76 | 2.51 | 4.60 | 2.37 | 3.95 | 2.04 | 3.94 | 2.07 |
| $Li_2O$ | 2.01 | 4.36 | 4.02 | 8.52 | 4.02 | 8.57 | 3.91 | 8.50 |
| $La_2O_3$ | — | — | — | — | — | — | 2.89 | 0.58 |
| $Y_2O_3$ | — | — | — | — | — | — | — | — |

|  | Example 5 | | Example 6 | | Example 7 | |
|---|---|---|---|---|---|---|
|  | Wt % | Mol % | Wt % | Mol % | Wt % | Mol % |
| $K_2O$ | 2.20 | 1.54 | 2.19 | 1.57 | 2.31 | 1.59 |
| $Na_2O$ | 3.66 | 3.91 | 3.49 | 3.80 | 3.62 | 3.80 |
| CaO | 1.25 | 1.47 | 1.24 | 1.50 | 1.25 | 1.45 |
| ZnO | 1.45 | 1.18 | 1.44 | 1.20 | 1.45 | 1.16 |
| $Al_2O_3$ | 5.70 | 3.70 | 4.72 | 3.12 | 5.86 | 3.74 |
| $B_2O_3$ | 21.82 | 20.75 | 21.34 | 20.70 | 22.22 | 20.77 |
| $SiO_2$ | 50.51 | 55.63 | 49.62 | 55.76 | 51.52 | 55.80 |
| ZrO | 3.76 | 2.02 | 3.75 | 2.05 | 3.91 | 2.07 |
| $Li_2O$ | 3.89 | 8.62 | 3.78 | 8.55 | 3.89 | 8.47 |
| $La_2O_3$ | 5.75 | 1.75 | 8.42 | 1.75 | — | — |
| $Y_2O_3$ | — | — | — | — | 3.97 | 1.15 |

Properties were assessed as follows:

| Frit of Example | Coefficient of Thermal expansion, ($\times 10^{-6}$) per °C. | Transition Temperature, °C. | Melting Temperature, °C. | Refractive Index |
|---|---|---|---|---|
| 2 | 6.84 | 507 | 556 | 1.520 |
| 3 | 6.80 | 507 | 556 | 1.530 |

The frits were made into white (with cerium oxide), blue-green (with cobalt chromium pigment) and yellow (with praseodymium—zircon pigment) enamel compositions using the following weight ratios of frit to pigment:

| | |
|---|---|
| White enamel | 10:1 |
| Blue-green enamel | 5:1 |
| Yellow enamel | 6.6:1 |

The enamel compositions were applied to porcelain and fired in the standard cycle. Properties of the fired enamels were assessed as follows:

| Frit of Example | Enamel Colour | Colour Strength | Gloss | Acid Resistance | Alkali Resistance |
|---|---|---|---|---|---|
| 1 | White | C | C− | A | E |
|   | Blue-Green | C | D | A | E |
|   | Yellow | C | C | A | E |
| 2 | White | C | C | A | A |
|   | Blue-Green | C | C | A | A |
|   | Yellow | C | C | A | B− |
| 3 | White | C | C | A | A |
|   | Blue-Green | C | D+ | A | B− |
|   | Yellow | C | C | A | B |
| 4 | White | C | C | A | B |
|   | Blue-Green | C | C− | A | B+ |
|   | Yellow | C | D+ | A | B |
| 5 | White | C | D | A | B |
|   | Blue-Green | C | D | A | B |
|   | Yellow | C | D+ | A | B |
| 6 | White | C | D− | A | B− |
|   | Blue-Green | C | D− | A | B− |
|   | Yellow | C | C | A | B |
| 7 | White | C | C− | A | A |
|   | Blue-Green | C | D+ | A | B |
|   | Yellow | C | C | A | B− |

The frits of Examples 3 and 4 were made into a wider range of enamel compositions as follows:

| Colour | Pigment Type | Frit:Pigment Weight Ratio |
|---|---|---|
| Orange | Sr Sb Ti | 3.92:1 |
| Iron Red | Fe | 8:1 |
| Blue | Co Al | 4:1 |
| Blue | Co Si | 4:1 |
| Brown | Fe Zn | 6.67:1 |
| Black | Cu Cr Mn | 5:1 |

This wider range of enamel compositions was tested on all the ceramic wares. Properties of the fired enamels on porcelain after the standard firing cycle were assessed as follows:

| Frit of Example | Colour | Gloss | Acid Resistance | Alkali Resistance |
|---|---|---|---|---|
| 3 | White | C | A | A |
|   | Yellow | C | A | C− |
|   | Orange | C | A | B |
|   | Iron Red | C− | A | B− |
|   | Blue (Co Al) | C | A | D |
|   | Blue (Co Si) | C | A | B |
|   | Blue-Green | C− | A | B |
|   | Brown | C | A | B+ |
|   | Black | C | A | C+ |
| 4 | White | C | A | A |
|   | Yellow | C | A | B− |
|   | Orange | C− | A | B |
|   | Iron Red | D | A | B− |
|   | Blue | D | A | C+ |
|   | Blue | D | C+ | B |
|   | Blue-Green | C− | A | B+ |
|   | Brown | C | A | A |
|   | Black | C− | A | B |

The results on porcelain after the fast firing cycle were very similar, though the enamel compositions based on the frit of Example 3 gave a better gloss than the enamel compositions based on the frit of Example 4. The cobalt-silica blue and the cobalt-alumina blue enamel compositions showed signs of attack by acid, the latter being more resistant.

The results after firing on china were excellent except for the cobalt-silica blue enamel compositions which were attacked by acid.

The results after firing on earthenware were excellent.

EXAMPLES 8–17

The following frits were prepared:

| | Example 8 | | Example 9 | | Example 10 | | Example 11 | | Example 12 | |
|---|---|---|---|---|---|---|---|---|---|---|
| | Wt % | Mol % | Wt % | Mol % | Wt % | Mol % | Wt % | Mol % | Wt % | Mol % |
| $K_2O$ | 2.31 | 1.57 | 2.30 | 1.58 | 2.31 | 1.57 | 2.30 | 1.57 | 2.29 | 1.56 |
| $Na_2O$ | 3.72 | 3.85 | 3.63 | 3.78 | 3.72 | 3.84 | 3.70 | 3.85 | 3.69 | 3.82 |
| CaO | 1.11 | 1.27 | 1.11 | 1.27 | 1.25 | 1.43 | 1.24 | 1.43 | 1.24 | 1.42 |
| ZnO | 1.45 | 1.14 | 1.44 | 1.15 | 1.45 | 1.14 | 1.44 | 1.14 | 1.44 | 1.14 |
| $Al_2O_3$ | 7.48 | 4.71 | 7.13 | 4.53 | 7.49 | 4.53 | 7.12 | 4.51 | 6.78 | 4.27 |
| $B_2O_3$ | 22.50 | 20.75 | 22.30 | 20.72 | 22.53 | 20.73 | 22.54 | 20.89 | 22.34 | 20.63 |
| $SiO_2$ | 52.27 | 55.85 | 51.88 | 55.84 | 52.34 | 55.79 | 51.80 | 55.61 | 52.40 | 56.04 |
| $ZrO_2$ | 3.92 | 2.04 | 3.90 | 2.05 | 3.92 | 2.04 | 3.90 | 2.04 | 3.89 | 2.03 |
| $Li_2O$ | 3.99 | 8.57 | 3.98 | 8.61 | 3.99 | 8.56 | 3.97 | 8.58 | 3.96 | 8.52 |
| $La_2O_3$ | 1.26 | 0.25 | 2.33 | 0.46 | — | — | — | — | — | — |
| $Y_2O_3$ | — | — | — | — | — | — | — | — | 1.97 | 0.56 |
| $Nd_2O_3$ | — | — | — | — | 1.00 | 0.18 | 1.98 | 0.38 | — | — |
| | Example 13 | | Example 14 | | Example 15 | | Example 16 | | Example 17 | |
| | Wt % | Mol % | Wt % | Mol % | Wt % | Mol % | Wt % | Mol % | Wt % | Mol % |

-continued

|  |  |  |  |  |  |  |  |  |  |  |
|---|---|---|---|---|---|---|---|---|---|---|
| K$_2$O | 2.31 | 1.58 | 2.31 | 1.58 | 2.31 | 1.57 | 2.32 | 1.59 | 2.32 | 1.59 |
| Na$_2$O | 3.71 | 3.87 | 3.71 | 3.86 | 3.72 | 3.85 | 3.64 | 3.79 | 3.64 | 3.80 |
| CaO | 0.83 | 0.96 | 0.83 | 0.96 | 0.83 | 0.95 | 0.83 | 0.96 | 0.83 | 0.96 |
| ZnO | 1.45 | 1.15 | 1.45 | 1.15 | 1.45 | 1.14 | 1.45 | 1.16 | 1.45 | 1.16 |
| Al$_2$O$_3$ | 7.32 | 4.63 | 7.32 | 4.63 | 7.33 | 4.61 | 7.19 | 4.56 | 7.19 | 4.57 |
| B$_2$O3 | 22.52 | 20.87 | 22.35 | 20.71 | 22.24 | 20.49 | 23.58 | 21.90 | 25.11 | 23.37 |
| SiO$_2$ | 52.06 | 55.90 | 50.77 | 54.50 | 50.35 | 53.74 | 49.77 | 53.55 | 48.25 | 52.03 |
| ZrO$_2$ | 3.92 | 2.05 | 4.89 | 2.56 | 4.90 | 2.55 | 4.92 | 2.58 | 4.91 | 2.58 |
| Li$_2$O | 3.99 | 8.62 | 4.86 | 9.68 | 4.99 | 10.72 | 4.07 | 9.54 | 4.04 | 9.55 |
| La$_2$O$_3$ | 1.88 | 0.37 | 1.88 | 0.37 | 1.88 | 0.37 | 1.89 | 0.38 | 1.89 | 0.38 |

Properties were assessed follows:

| Frit of Example | Coefficient of Thermal Expansion, (×10$^{-6}$) per °C. | Transition Temperature, °C. | Melting Temperature, °C. | Refractive Index |
|---|---|---|---|---|
| 13 | 7.11 | 511 | 566 | 1.535 |
| 14 | 7.10 | 521 | 582 | 1.535 |
| 15 | 7.71 | 511 | 555 | 1.54 |
| 16 | 7.10 | 517 | 577 | 1.54 |
| 17 | 6.98 | 514 | 564 |  |

The frits of Examples 13–17 were made up into white, yellow and blue-green enamel compositions in an analogous way to that described in Examples 1–7.

The enamel compositions were applied to porcelain and fired in the standard firing cycle and the fast firing cycle, and to china. Properties of the fired enamels on porcelain after the standard firing cycle were assessed as follows:

| Frit of Example | Colour | Colour Strength | Gloss | Acid Resistance | Alkali Resistance |
|---|---|---|---|---|---|
| 13 | White | C | C | A | A– |
|  | Blue-Green | C | C | A | B |
|  | Yellow | C– | C– | A | D |
| 14 | White | C | C | A | A– |
|  | Blue-Green | C | C | A | C+ |
|  | Yellow | C– | C | A | D |
| 15 | White | C | C | A | A– |
|  | Blue-Green | C | C | A | C+ |
|  | Yellow | C | C | A | D+ |
| 16 | White | C | C | A | A– |
|  | Blue-Green | C | C | A | B |
|  | Yellow | C | C | A | D |
| 17 | White | C | C | A | B |
|  | Blue-Green | C | C | A | C– |
|  | Yellow | C | C | A | D |

The results on porcelain after the fast firing cycle were the same as those after the standard firing cycle.

The results after firing on china showed excellent gloss and acid resistance. The alkali resistance was very good except in the case of the yellow enamels, which showed slight attack.

The frits of Examples 15 and 16 were made into a wider range of enamel compositions in an analogous way to that described in Examples 1–7. The enamel compositions were applied to porcelain and fired in the standard firing cycle and the fast firing cycle, and to china. The properties of the fired enamels on porcelain after the standard firing were assessed as follows:

| Frit of Example | Colour | Gloss | Acid Resistance | Alkali Resistance |
|---|---|---|---|---|
| 15 | White | C | A | B |
|  | Blue-Green | C | A | B |
|  | Yellow | C | A | D+ |
|  | Orange | C | A | A– |
|  | Iron Red | C | A | C+ |
|  | Blue (Co Al) | C | A– | D |
|  | Blue (Co Si) | C | D | D+ |
|  | Brown | C | A | C– |
|  | Black | C | A– | B– |
| 16 | White | C | A | A |
|  | Blue-Green | C | A | A– |
|  | Yellow | C | A | D+ |
|  | Orange | C | A | A– |
|  | Blue (Co Al) | C | A | D+ |
|  | Blue (Co Si) | C | B | C– |
|  | Brown | C | A | B |
|  | Black | C | A | B+ |

The results on porcelain after the fast firing cycle showed the same trends as those after the standard firing cycle, but the alkali resistance was slightly worse.

The results after firing on china were excellent. Only the yellow and cobalt-alumina blue enamel compositions showed slight attack.

EXAMPLES 18–20

The following frits were prepared:

|  | Example 18 | | Example 19 | | Example 20 | |
|---|---|---|---|---|---|---|
|  | Wt % | Mol % | Wt % | Mol % | Wt % | Mol % |
| K$_2$O | 2.33 | 1.60 | 2.33 | 1.60 | 2.34 | 1.62 |
| Na$_2$O | 3.66 | 3.81 | 3.66 | 3.82 | 3.67 | 3.86 |
| CaO | 0.84 | 0.97 | 0.84 | 0.97 | 0.84 | 0.98 |
| ZnO | 1.46 | 1.16 | 1.46 | 1.16 | 1.47 | 1.17 |
| Al$_2$O$_3$ | 7.24 | 4.59 | 8.22 | 5.21 | 8.26 | 5.27 |
| B$_2$O$_3$ | 23.56 | 21.89 | 23.59 | 21.91 | 23.54 | 21.99 |
| SiO$_2$ | 49.28 | 53.03 | 49.34 | 53.09 | 48.28 | 52.25 |
| ZrO$_2$ | 5.93 | 3.11 | 4.95 | 2.60 | 5.96 | 3.15 |
| Li$_2$O | 4.43 | 9.59 | 4.33 | 9.38 | 4.35 | 9.47 |
| La$_2$O$_3$ | 1.27 | 0.25 | 1.27 | 0.25 | 1.27 | 0.25 |

Properties were assessed as follows:

| Frit of Example | Coefficient of Thermal Expansion, (×10$^{-6}$) per °C. | Transition Temperature, °C. | Melting Temperature, °C. | Refractive Index |
|---|---|---|---|---|
| 18 | 7.01 | 512 | 566 | 1.545 |
| 19 | 6.92 | 507 | 575 | 1.53 |

-continued

| Frit of Example | Coefficient of Thermal Expansion, ($\times 10^{-6}$) per °C. | Transition Temperature, °C. | Melting Temperature, °C. | Refractive Index |
|---|---|---|---|---|
| 20 | 7.51 | 507 | 557 | 1.54 |
| 26 | 7.49 | 500 | 551 | 1.54 |

The frits were made into enamel compositions in an analogous way to that described in Examples 1–7. The enamel compositions were applied to porcelain and fired in the standard firing cycle. Properties were assessed as follows:

| Frit of Example | Colour | Gloss | Acid Resistance | Alkali Resistance |
|---|---|---|---|---|
| 18 | White | C | A | C |
|  | Blue-Green | C | A | C– |
|  | Yellow | C | A | C– |
| 19 | White | C | A | A– |
|  | Blue-Green | C | A | B |
|  | Yellow | C | A | C– |
|  | Orange | C | A | B– |
|  | Iron Red | C | A | D+ |
|  | Blue (Co Al) | C | A– | E+ |
|  | Blue (Co Si) | C | C+ | D– |
|  | Brown | C | A | C– |
|  | Black | C | A | D+ |
| 20 | White | C | A | C |
|  | Blue-Green | C | A | C |
|  | Yellow | C | A | D– |
|  | Orange | C | A | C+ |
|  | Iron-Red | C | A | D |
|  | Blue (Co Al) | C | A– | E+ |
|  | Blue (Co Al) | C | B– | D– |
|  | Brown | C | A | C |
|  | Black | C | A | D– |

The frits were made into enamel compositions in an analogous way to that described in Examples 1–7. The enamel compositions were applied to porcelain and fired in the standard firing cycling. Properties were assessed as follows:

| Frit of Example | Colour | Gloss | Acid Resistance | Alkali Resistance |
|---|---|---|---|---|
| 21 | White | C | A | B– |
|  | Blue-Green | C | A | C– |
|  | Yellow | C | A | C– |
| 22 | White | C | A | C |
|  | Blue-Green | C– | A | C– |
|  | Yellow | C | A | C |
| 23 | White | C | A | A– |
|  | Blue-Green | C | A | A– |
|  | Yellow | C | A | A– |
| 24 | White | C | A | A– |
|  | Blue-Green | C | A | A– |
|  | Yellow | C | A | A– |
| 25 | White | C | A | B |
|  | Blue-Green | C | A | B |
|  | Yellow | C | A | B |
| 26 | White | C | A | C+ |
|  | Blue-Green | C | A | B– |
|  | Yellow | C | A | C |

EXAMPLES 21–26

The following frits were prepared:

|  | Example 21 | | Example 22 | | Example 23 | | Example 24 | | Example 25 | | Example 26 | |
|---|---|---|---|---|---|---|---|---|---|---|---|---|
|  | Wt % | Mol % | Wt % | Mol % | Wt % | Mol % | Wt % | Mol % | Wt % | Mol % | Wt % | Mol % |
| $K_2O$ | 2.32 | 1.60 | 2.32 | 1.60 | 2.31 | 1.56 | 2.29 | 1.53 | 2.33 | 1.60 | 2.33 | 1.61 |
| $Na_2O$ | 3.64 | 3.82 | 3.63 | 3.82 | 3.63 | 3.73 | 3.59 | 3.64 | 3.65 | 3.81 | 3.66 | 3.83 |
| CaO | 0.84 | 0.97 | 0.83 | 0.97 | 0.83 | 0.95 | 0.82 | 0.92 | 0.84 | 0.97 | 0.84 | 0.97 |
| ZnO | 1.46 | 1.16 | 1.45 | 1.16 | 1.45 | 1.14 | 1.44 | 1.11 | 1.95 | 1.55 | 2.44 | 1.94 |
| $Al_2O_3$ | 9.16 | 5.83 | 10.11 | 6.46 | 8.15 | 5.09 | 8.07 | 4.97 | 8.20 | 5.21 | 8.22 | 5.23 |
| $B_2O_3$ | 23.48 | 21.89 | 23.43 | 21.93 | 22.27 | 20.38 | 21.21 | 19.16 | 23.54 | 21.89 | 23.60 | 21.98 |
| $SiO_2$ | 48.61 | 52.51 | 47.75 | 51.80 | 48.91 | 51.87 | 48.42 | 50.67 | 48.97 | 52.76 | 48.35 | 52.17 |
| $ZrO_2$ | 4.92 | 2.59 | 4.91 | 2.60 | 4.90 | 2.54 | 4.85 | 2.48 | 4.94 | 2.59 | 4.95 | 2.60 |
| $Li_2O$ | 4.31 | 9.37 | 4.30 | 9.39 | 4.28 | 9.12 | 4.27 | 9.99 | 4.32 | 9.37 | 4.34 | 9.41 |
| $La_2O_3$ | 1.26 | 0.25 | 1.26 | 0.25 | 1.26 | 0.25 | 1.24 | 0.24 | 1.26 | 0.25 | 1.27 | 0.25 |
| $F_2$ | — | — | — | — | 2.01 | 3.37 | 3.79 | 6.28 | — | — | — | — |

Properties were assessed as follows:

| Frit of Example | Coefficient of Thermal Expansion, ($\times 10^{-6}$) per °C. | Transition Temperature, °C. | Melting Temperature, °C. | Refractive Index |
|---|---|---|---|---|
| 21 | 7.25 | 498 | 536 | 1.54 |
| 22 | 7.07 | 493 | 542 | 1.525 |
| 23 | 7.09 | 475 | 532 | 1.53 |
| 24 | 7.29 | 445 | 512 | 1.53 |
| 25 | 7.16 | 497 | 537 | 1.535 |

EXAMPLES 27–30

The following frits were prepared.

|  | Example 27 | | Example 28 | | Example 29 | | Example 30 | |
|---|---|---|---|---|---|---|---|---|
|  | Wt % | Mol % | Wt % | Mol % | Wt % | Mol % | Wt % | Mol % |
| $Al_2O_3$ | 7.20 | 4.55 | 7.20 | 4.55 | 7.19 | 4.55 | 7.20 | 4.55 |
| $B_2O_3$ | 23.61 | 21.84 | 23.62 | 21.85 | 23.58 | 21.85 | 23.63 | 21.86 |
| CaO | 0.84 | 0.96 | 0.84 | 0.96 | 0.83 | 0.96 | 0.84 | 0.96 |
| $Ce_2O_3$ | 1.14 | 0.22 | 0.57 | 0.11 | — | — | — | — |
| $CeO_2$ | 0.36 | 0.13 | 0.18 | 0.07 | — | — | — | — |
| $K_2O$ | 2.32 | 1.59 | 2.32 | 1.59 | 2.32 | 1.59 | 2.32 | 1.59 |

| | | | | | | | | |
|---|---|---|---|---|---|---|---|---|
| La₂O₃ | — | — | 0.72 | 0.14 | — | — | 0.72 | 0.14 |
| Li₂O | 4.41 | 9.51 | 4.41 | 9.51 | 4.40 | 9.51 | 4.42 | 9.52 |
| Na₂O | 3.64 | 3.78 | 3.65 | 3.79 | 3.64 | 3.78 | 3.65 | 3.79 |
| Pr₂O₃ | — | — | — | — | 1.66 | 0.32 | 0.71 | 0.14 |
| SiO₂ | 50.09 | 53.68 | 50.10 | 53.20 | 50.00 | 53.70 | 50.12 | 53.72 |
| ZnO | 1.46 | 1.15 | 1.46 | 1.15 | 1.45 | 1.15 | 1.46 | 1.15 |
| ZrO₂ | 4.92 | 2.57 | 4.02 | 2.57 | 4.91 | 2.57 | 4.93 | 2.57 |

Properties were assessed as follows:

| Frit of Example | Coefficient of Thermal Expansion (×10⁻⁶) per °C. | Transition Temperature, °C | Melting Temperature, °C | Refractive Index |
|---|---|---|---|---|
| 27 | 7.17 | 515 | 567 | 1.535 |
| 28 | 7.17 | 515 | 557 | 1.545 |
| 29 | 7.20 | 511 | 565 | 1.54 |
| 30 | 7.52 | 512 | 561 | 1.55 |

The frits were made into enamel compositions in an analogous way to that described in Examples 1–7. The enamel compositions were applied to porcelain and fired in the standard firing cycle. Properties were assessed as follows:

| Frit of Example | Colour | Gloss | Acid Resistance | Alkali Resistance |
|---|---|---|---|---|
| 27 | White | C+ | A | C |
|    | Green | C  | A | C- |
|    | Yellow | C+ | A | D |
| 28 | White | C  | A | C+ |
|    | Green | C  | A | C |
|    | Yellow | C | A | C+ |
| 29 | White | C+ | A | A- |
|    | Green | C  | A | A |
|    | Yellow | C | A | A- |
| 30 | White | C  | A | A- |
|    | Green | C  | A | A |
|    | Yellow | C | A | A |

The results when fired on china were very good with only a slight discoloration of white enamel of frit 29.

EXAMPLES 31–34

The following frits were prepared:

| | Example 31 | | Example 32 | | Example 33 | | Example 34 | |
|---|---|---|---|---|---|---|---|---|
| | Wt % | Mol % | Wt % | Mol % | Wt % | Mol % | Wt % | Mol % |
| Al₂O₃ | 8.05 | 4.89 | 7.94 | 4.76 | 8.00 | 4.97 | 8.00 | 4.93 |
| B₂O₃ | 19.94 | 17.74 | 18.70 | 16.42 | 21.07 | 19.17 | 21.18 | 19.14 |
| CaO | 0.82 | 0.90 | 0.81 | 0.88 | — | — | — | — |
| F₂ | 5.97 | 9.74 | 7.93 | 12.75 | 3.66 | 6.10 | 3.84 | 6.35 |
| K₂O | 2.29 | 1.50 | 2.25 | 1.46 | 3.59 | 2.42 | 2.32 | 1.55 |
| La₂O₃ | 1.24 | 0.24 | 1.23 | 0.23 | 1.26 | 0.25 | 1.26 | 0.24 |
| Li₂O | 4.26 | 8.83 | 4.20 | 8.58 | 4.18 | 8.87 | 4.32 | 9.10 |
| Na₂O | 3.53 | 3.52 | 3.50 | 3.45 | 3.56 | 3.64 | 4.46 | 4.53 |
| SiO₂ | 47.62 | 49.09 | 47.23 | 48.03 | 48.30 | 50.93 | 48.25 | 50.52 |
| ZnO | 1.43 | 1.09 | 1.41 | 1.06 | 1.45 | 1.13 | 1.45 | 1.12 |
| ZrO₂ | 4.85 | 2.44 | 4.78 | 2.37 | 4.92 | 2.53 | 4.91 | 2.51 |

Properties were assessed as follows:

| Frit of Example | Coefficient of thermal Expansion (×10⁻⁶) per °C. | Transition Temperature, °C | Melting Temperature, °C | Refractive Index |
|---|---|---|---|---|
| 31 | 8.00 | 447 | 507 | 1.54 |
| 32 | 8.18 | 460 | 528 | 1.53 |
| 33 | 7.78 | 453 | 512 | 1.53 |
| 34 | 8.27 | 448 | 506 | 1.535 |

The frits were made into enamel compositions in an analogous way to that described in Examples 1–7. The enamels were applied to porcelain and china and fired in standard firing cycles. The properties were assessed as follows:

On Porcelain

| Frit of Example | Colour | Gloss | Acid Resistance | Alkali Resistance |
|---|---|---|---|---|
| 31 | White | C | A | A- |
|    | Green | C | A | A- |
|    | Yellow | C | A | A |
| 32 | White | C | A | A |
|    | Green | C | A | A- |
|    | Yellow | C | A | A |
| 33 | White | C- | A | A |
|    | Green | C+ | A | A |
|    | Yellow | C- | A | A |
| 34 | White | C | A | A |
|    | Green | C | A | A |
|    | Yellow | C | A | A |

The results on china were slightly better than the results obtained on porcelain.

EXAMPLES 35–38

The following frits were prepared:

| | Example 35 | | Example 36 | | Example 37 | | Example 38 | |
|---|---|---|---|---|---|---|---|---|
| | Wt % | Mol % | Wt % | Mol % | Wt % | Mol % | Wt % | Mol % |
| Al₂O₃ | 7.98 | 4.93 | 8.00 | 4.93 | 8.00 | 4.96 | 7.84 | 4.88 |
| B₂O₃ | 21.13 | 19.14 | 21.19 | 19.14 | 21.02 | 19.09 | 21.02 | 19.18 |
| F₂ | 3.83 | 6.35 | 3.84 | 6.35 | 3.83 | 6.39 | 3.83 | 6.41 |
| CaO | — | — | 0.42 | 0.47 | — | — | — | — |
| K₂O | 3.00 | 2.01 | 2.32 | 1.55 | 2.31 | 1.55 | 2.31 | 1.56 |
| La₂O₃ | 1.26 | 0.24 | 1.26 | 0.24 | 1.26 | 0.24 | 1.26 | 0.25 |
| Li₂O | 4.31 | 9.10 | 4.32 | 9.10 | 4.32 | 9.14 | 4.32 | 9.18 |
| Na₂O | 4.00 | 4.10 | 4.01 | 4.07 | 4.46 | 4.55 | 4.37 | 4.47 |
| SiO₂ | 48.13 | 50.52 | 48.27 | 50.51 | 47.46 | 49.94 | 46.72 | 49.39 |
| ZnO | 1.45 | 1.12 | 1.45 | 1.12 | 1.45 | 1.13 | 1.45 | 1.13 |
| ZrO₂ | 4.90 | 2.51 | 4.91 | 2.51 | 5.89 | 3.02 | 6.87 | 3.54 |

Properties were assessed as follows:

| Frit of Example | Coefficient of Thermal Expansion, (×10⁻⁶) per °C. | Transition Temperature, °C. | Melting Temperature, °C. | Refractive Index |
|---|---|---|---|---|
| 35 | 7.77 | 447 | 512 | 1.54 |
| 36 | 7.64 | 461 | 522 | 1.545 |
| 37 | 8.04 | 449 | 510 | 1.535 |
| 38 | 7.99 | 458 | 524 | 1.54 |

The frits were made into enamel compositions in an analagous way to that described in Examples 1–7. The enamel compositions were applied to porcelain and china and were fired in the standard firing cycles. Properties were assessed as follows:

Assessment Results on Porcelain

| Frit of Example | Colour | Gloss | Acid Resistance | Alkali Resistance |
|---|---|---|---|---|
| 35 | White | C | A | A |
|  | Green | C | A | B |
|  | Blue | C | A | D |
| 36 | White | C+ | A | A |
|  | Green | C+ | A | A |
|  | Blue | C+ | A | C |
| 37 | White | C− | A | B |
|  | Green | C | A | A |
|  | Blue | C | A | C |
| 38 | White | C | A | B |
|  | Green | C | A | B |
|  | Blue | C+ | A | D |

On china good results for alkali and acid resistance were obtained.

EXAMPLES 39–41

The following frits were prepared:

|  | Example 39 | | Example 40 | | Example 41 | |
|---|---|---|---|---|---|---|
|  | Wt % | Mol % | Wt % | Mol % | Wt % | Mol % |
| $Al_2O_3$ | 4.98 | 3.16 | 7.93 | 5.21 | 11.77 | 7.86 |
| $B_2O_3$ | 18.72 | 17.37 | 21.76 | 20.94 | 15.42 | 15.09 |
| CaO | 1.02 | 1.18 | 0.88 | 1.05 | 0.88 | 1.07 |
| $K_2O$ | 1.95 | 1.34 | 2.32 | 1.65 | 2.94 | 2.12 |
| $La_2O_3$ | 3.60 | 0.71 | 2.85 | 0.59 | 2.85 | 0.60 |
| $Li_2O$ | 3.37 | 7.26 | 2.75 | 6.16 | 5.61 | 12.78 |
| $Na_2O$ | 2.91 | 3.03 | 6.00 | 6.48 | 4.47 | 4.91 |
| $SiO_2$ | 58.81 | 63.22 | 47.67 | 53.15 | 41.03 | 46.52 |
| ZnO | 1.01 | 0.81 | 1.79 | 1.47 | 2.56 | 2.14 |
| $ZrO_2$ | 3.61 | 1.89 | 6.04 | 3.29 | 12.46 | 6.89 |

The properties were assessed as follows:

| Frit of Example | Coefficient of Thermal Expansion, $(\times 10^{-6})$ per °C. | Transition Temperature, °C. | Melting Temperature, °C. | Refractive Index |
|---|---|---|---|---|
| 39 | 6.63 | 525 | 584 | 1.53 |
| 40 | 7.44 | 509 | 571 | 1.54 |
| 41 | 9.21 | 511 | 565 | 1.56 |

The frits were made into enamel compositions in an analogous way to that described in Examples 1–7. The enamels were applied to porcelain and china were fired in standard firing cycles.

| Frit of Example | Colour | Gloss | Acid Resistance | Alkali Resistance |
|---|---|---|---|---|
| 39 | White | C | A | B |
|  | Green | C | A | A |
|  | Yellow | C | A | A |
| 40 | White | C | A | B |
|  | Green | C | A | B |
|  | Yellow | C | A | A |
| 41 | White | C | A | A |
|  | Green | C | A | A |
|  | Yellow | C | A | A |

The results on china all showed excellent acid and alkali resistance.

EXAMPLES 42–46

The following frits were prepared.

|  | Example 42 | | Example 43 | | Example 44 | | Example 45 | | Example 46 | |
|---|---|---|---|---|---|---|---|---|---|---|
|  | Wt % | Mol % | Wt % | Mol % | Wt % | Mol % | Wt % | Mol % | Wt % | Mol % |
| $Al_2O_3$ | 8.02 | 5.20 | 4.25 | 2.16 | 4.25 | 2.69 | 11.92 | 7.86 | 11.61 | 7.80 |
| $B_2O_3$ | 22.06 | 20.93 | 16.68 | 15.00 | 16.30 | 14.97 | 15.56 | 15.02 | 15.30 | 15.05 |
| CaO | 0.84 | 0.98 | 0.84 | 0.93 | 0.84 | 0.95 | 0.84 | 1.00 | 0.83 | 1.02 |
| $K_2O$ | 2.33 | 1.64 | 3.16 | 2.10 | 1.67 | 1.13 | 3.00 | 2.13 | 1.50 | 1.09 |
| $La_2O_3$ | 2.89 | 0.59 | 3.06 | 0.59 | 3.07 | 0.60 | 2.88 | 0.59 | 2.89 | 0.61 |
| $Li_2O$ | 4.11 | 9.09 | 5.60 | 11.73 | 2.91 | 6.22 | 5.20 | 11.70 | 2.70 | 6.20 |
| $Na_2O$ | 3.56 | 3.79 | 4.88 | 4.93 | 2.53 | 2.61 | 4.58 | 4.97 | 2.38 | 2.63 |
| $SiO_2$ | 48.17 | 52.95 | 57.30 | 59.70 | 64.34 | 68.46 | 44.34 | 49.60 | 51.27 | 58.44 |
| ZnO | 1.94 | 1.58 | 0.96 | 0.74 | 0.97 | 0.76 | 2.66 | 2.20 | 2.66 | 2.24 |
| $ZrO_2$ | 6.07 | 3.25 | 3.27 | 1.66 | 3.12 | 1.61 | 9.00 | 4.91 | 8.85 | 4.92 |

Properties were assessed as follows:

| Frit of Example | Coefficient of Thermal Expansion, $(\times 10^{-6})$ per °C. | Transition Temperature, °C. | Melting Temperature, °C. | Refractive Index |
|---|---|---|---|---|
| 42 | 7.12 | 514 | 567 | 1.54 |
| 43 | 8.48 | 510 | 558 | 1.545 |
| 44 | 6.52 | 533 | 608 | 1.54 |
| 45 | 8.70 | 506 | 563 | 1.545 |
| 46 | 6.17 | 539 | 604 | 1.535 |

The frits were made into enamel compositions in an aqueous way to that described in Examples 1–7. The enamel compositions were applied to porcelain and china and were fired in standard firing cycles.

Assessment Results on Porcelain

| Frit of Example | Colour | Gloss | Acid Resistance | Alkali Resistance |
|---|---|---|---|---|
| 42 | White | C | A | A |
|  | Green | C | A | A |
|  | Yellow | C | A | A |
| 43 | White | C | A | B |

-continued

| Frit of Example | Colour | Gloss | Acid Resistance | Alkali Resistance |
|---|---|---|---|---|
| | Green | C | A | B |
| | Yellow | C | A | B |
| 44 | White | C | A | B |
| | Green | C | A | A |
| | Yellow | C | A | A |
| 45 | White | C | A | A |
| | Green | C | A | B |
| | Yellow | C | A | B |
| 46 | White | C | A | B |
| | Green | C | A | C |
| | Yellow | C | A | C |

On china excellent results were obtained for both acid and alkali resistance in all cases.

The frit of Example 42 was made into a wider range of enamel composition in an analogous way to that described in Examples 1–7. The enamel compositions were applied to porcelain and china and fired in standard firing cycles.

The results on porcelain were assessed as follows:

| Frit of Example | Colour | Gloss | Acid Resistance | Alkali Resistance |
|---|---|---|---|---|
| 42 | White | C | A | A |
| | Blue Green | C | A | A |
| | Yellow | C | A | A |
| | Orange | C− | A | B |
| | Iron Red | C+ | A | C |
| | Blue (Co Al) | C | A | C |
| | Blue (Co Si) | C | A | D |
| | Brown | C | A | B |
| | Black | C+ | A | B |

On china, good alkali and acid resistance was observed for all enamel compositions with the exception of the Iron Red which showed slight attack on alkali testing.

I claim:

1. A glass flux composition consisting essentially in mol percent of 3.0–13.0 lithium oxide, 0.5–1.2 potassium oxide, 2.5–7.0 sodium oxide, 0.5–1.2 zinc oxide, 2.0–8.0 aluminium oxide, 15–30 boron oxide, 44–68 silica, 1.0–7.0 zirconium oxide, 0–4.0 calcium oxide, 0–3.0 lanthanum oxide, 0–1.0 other rare earth metal oxide, 0–1.0 yttrium oxide, 0–4.0 magnesium oxide, 0–4.0 strontium oxide, 0–4.0 titanium oxide, 0–10 phosphorus pentoxide, 0–1.5 lead oxide and 0–13.0 fluoride.

2. A glass flux composition according to claim 1 consisting essentially in mol percent of 3.0–11.5 lithium oxide, 0.5–3.5 potassium oxide, 2.5–5.0 sodium oxide, 0.5–4.0 calcium oxide, 0.5–1.2 zinc oxide, 2.0–7.5 aluminium oxide, 15–30 boron oxide, 44–68 silica, 1.0–5.0 zirconium oxide, 0–3.0 lanthanum oxide, 0–1.0 other rare earth metal oxide, 0–1.0 yttrium oxide, 0–4.0 magnesium oxide, 0–4.0 strontium oxide, 0–4.0 titanium oxide, 0–10 phosphorus pentoxide, 0–1.5 lead oxide and 0–8.0 fluoride.

3. A composition according to claim 1 which contains 0.1–3.0 mol percent lanthanum oxide.

4. A composition according to claim 1 which comprises a frit.

5. An enamel composition consisting essentially by weight of 10–90% of the composition claimed in claim 4 together with 10–90% pigment.

6. A cover flux composition comprising the composition claimed in claim 4 dispersed in a carrier material.

7. An article bearing on its surface an enamel composition which has been fired thereon, which enamel composition is as claimed in claim 5.

8. An article bearing on its surface a cover flux composition which has been fired thereon, which cover flux composition is as claimed in claim 6.

9. An article according to claim 7 which is a ceramic article.

10. An article according to claim 8 which is a ceramic article.

11. A composition according to claim 1 whose melting temperature is in the range 500°–580° C.

12. A method of decorating an article, which method comprises applying to the article an enamel composition claimed in claim 5 and then firing the composition.

13. A method of protecting an article, which method comprises applying to the article a cover flux composition claimed in claim 6, and then firing the composition.

* * * * *